(12) United States Patent
Nii et al.

(10) Patent No.: US 10,611,065 B2
(45) Date of Patent: Apr. 7, 2020

(54) MANUFACTURING METHOD FOR CONVEYANCE SEAT

(71) Applicant: TOYOTA BOSHOKU KABUSHIKI KAISHA, Aichi-ken (JP)

(72) Inventors: Tomoki Nii, Aihci-ken (JP); Yoshiyuki Murata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 1478 days.

(21) Appl. No.: 14/227,288

(22) Filed: Mar. 27, 2014

(65) Prior Publication Data
US 2014/0291880 A1    Oct. 2, 2014

(30) Foreign Application Priority Data

Mar. 29, 2013 (JP) ................................. 2013-070919

(51) Int. Cl.
- B29C 44/12 (2006.01)
- B60N 2/58 (2006.01)
- B60N 2/70 (2006.01)

(52) U.S. Cl.
CPC ........ B29C 44/1233 (2013.01); B60N 2/5875 (2013.01); B60N 2/7017 (2013.01)

(58) Field of Classification Search
CPC ............ B29C 44/1228; B29C 44/1233; B60N 2/7017; B60N 2/5875
See application file for complete search history.

(56) References Cited

U.S. PATENT DOCUMENTS

| | | | | |
|---|---|---|---|---|
| 4,046,611 A | * | 9/1977 | Sanson | B29C 44/146 156/274.4 |
| 4,699,427 A | * | 10/1987 | Kobayashi | B29D 99/0092 297/452.27 |
| 5,096,639 A | * | 3/1992 | Hughes | B29C 44/1238 264/257 |
| 5,176,860 A | * | 1/1993 | Storch | B29C 44/1257 264/255 |

(Continued)

FOREIGN PATENT DOCUMENTS

| | | |
|---|---|---|
| CN | 101448437 | 6/2009 |
| CN | 102239036 | 11/2011 |

(Continued)

OTHER PUBLICATIONS

Office Action issued in China Counterpart Patent Appl. No. 201410126481.0, dated Dec. 1, 2015, along with an English translation thereof.

(Continued)

*Primary Examiner* — Joseph S Del Sole
*Assistant Examiner* — Yung-Sheng M Tsui
(74) *Attorney, Agent, or Firm* — Greenblum & Bernstein, P.L.C.

(57) ABSTRACT

A manufacturing method for a conveyance seat having a pad structure including a seat pad and a back face member includes integrally molding the seat pad with the back face member in a state where the back face member is arranged so as to cross over at least part of a parting line that is formed by laying a first sub element and a second sub element of a molding die on top of each other, the molding die being formed of at least the first sub element and the second sub element.

3 Claims, 5 Drawing Sheets

(56) References Cited

U.S. PATENT DOCUMENTS

| | | | | |
|---|---|---|---|---|
| 6,685,862 | B1* | 2/2004 | Hanagan | B29C 44/086 |
| | | | | 156/213 |
| 7,201,112 | B2* | 4/2007 | Jolley | B29C 44/105 |
| | | | | 114/357 |
| 7,444,700 | B2* | 11/2008 | Koutsky | B29C 44/0415 |
| | | | | 5/653 |
| 8,944,515 | B2* | 2/2015 | Kono | B60N 2/64 |
| | | | | 297/218.3 |
| 2013/0127225 | A1* | 5/2013 | Kono | B60N 2/64 |
| | | | | 297/452.18 |
| 2014/0239697 | A1* | 8/2014 | Nii | B60N 2/58 |
| | | | | 297/452.61 |
| 2015/0174799 | A1* | 6/2015 | Sumi | B29C 51/12 |
| | | | | 428/304.4 |

FOREIGN PATENT DOCUMENTS

| | | |
|---|---|---|
| JP | 02-038008 | 2/1990 |
| JP | 02-063805 | 3/1990 |
| JP | 06-206229 | 7/1994 |
| JP | 2005-237491 | 9/2005 |
| JP | 2008-307834 | 12/2008 |
| JP | 2011-110798 | 6/2011 |
| JP | 2012-034894 | 2/2012 |
| WO | 00/78521 | 12/2000 |

OTHER PUBLICATIONS

Office Action issued in China Counterpart Patent Appl. No. 201410126481.0, dated Jun. 7, 2016 , along with an English translation thereof.

Office Action issued in Japan Counterpart Patent Appl. No. 2013-070919, dated Jul. 5, 2016 , along with an English translation thereof.

Office Action issued in Japan Patent Appl. No. 2013-070919, dated Jan. 17, 2017, along with an English language translation thereof.

* cited by examiner

MANUFACTURING METHOD FOR CONVEYANCE SEAT

INCORPORATION BY REFERENCE

The disclosure of Japanese Patent Application No. 2013-070919 filed on Mar. 29, 2013 including the specification, drawings and abstract is incorporated herein by reference in its entirety.

BACKGROUND OF THE INVENTION

1. Field of the Invention

The invention relates to a conveyance seat. Specifically, the invention relates to a manufacturing method for a conveyance seat including a back face member.

2. Description of Related Art

There is known a conveyance seat including a seat frame and a seat pad. Japanese Patent Application Publication No. 2008-307834 (JP 2008-307834 A) describes that a reinforcement member called a back face member is arranged on a face at a side at which the seat pad contacts with the seat frame. The back face member serves to prevent noise that occurs at the time of interference with the seat frame or to increase the stiffness of the seat. Generally, the back face member is configured such that an end portion of the back face member is arranged at a portion receded by about 5 mm from a portion at which sub elements of a molding die are mated (parting line). This is because the sub elements do not sufficiently closely contact with each other due to the fact that the back face member is fitted to a portion that forms the parking line and, as a result, there occurs a phenomenon like a resin, or the like, leaks therefrom. As a result, as shown in FIG. 6, back face members 5 may be non-continuously arranged also at a place that is adjacent to the seat frame 8.

SUMMARY OF THE INVENTION

However, with the above configuration, the seat pad, the seat frame, and the like, may directly contact with a portion at which the back face member is not allowed to be provided, so there is a concern that noise occurs. In addition, because the back face members are to increase the stiffness of the seat pad, a portion having no back face member is weaker than portions having the back face members. When an excessively large load acts on the portion at which no back face member is provided, the seat pad may split off unexpectedly.

The invention provides a manufacturing method for a conveyance seat, which allows a back face member to be arranged at a required portion at the time of manufacturing a seat pad structure integrally molded from a seat pad and the back face member.

An aspect of the invention provides a manufacturing method for a conveyance seat having a pad structure including a seat pad and a back face member. The manufacturing method includes integrally molding the seat pad with the back face member in a state where the back face member is arranged so as to cross over at least part of a parting line that is formed by laying a first sub element and a second sub element of a molding die on top of each other, the molding die being formed of at least the first sub element and the second sub element.

According to the above aspect, in the manufacturing method for the conveyance seat having the seat pad structure including the seat pad and the back face member, the seat pad and the back face member are integrally molded in the molding die formed of the plurality of sub elements, the seat pad and the back face member are integrally molded with each other in a state where the back face member is arranged so as to cross over at least part of the parting line that is formed by laying the sub elements on top of each other. Therefore, the flexibility of arrangement of the back face member increases. Because the back face member is arranged at a position at which the back face member faces the parting line of the molding die, foam is hard to enter the parting line.

In the above aspect, the manufacturing method may further include: arranging a first back face member on the first sub element; arranging a second back face member on the second sub element; adjacently arranging part of the first back face member and part of the second back face member such that the part of the first back face member and the part of the second back face member overlap with each other by combining the first sub element with the second sub element; and integrating the seat pad with the back face member by carrying out molding in a state where the part of the first back face member and the part of the second back face member are arranged adjacently to each other.

According to the above aspect, by arranging the first back face member on the first sub element of the molding die foamed by combining the plurality of sub elements, arranging the second back face member on the second sub element of the molding die and combining the first sub element and the second sub element with each other, part of the first back face member and part of the second back face member are adjacently arranged so as to overlap with each other, and the seat pad and the back face member are integrated with each other by carrying out molding in a state where the part of the first back face member and the part of the second back face member are arranged adjacently to each other. Therefore, there occurs no inevitable gap that is exposed from the gap between the end portion of the first back face member and the end portion of the second back face member. Thus, it is allowed to arrange the back face member at a required place, so it is possible to suppress an inconvenience that can occur due to the absence of the back face member. Because the back face members arranged respectively on the first sub element and the second sub element are adjacently arranged so as to overlap with each other by combining the first sub element with the second sub element, it is possible to collectively carry out work for laying the first back face member on the second back face member and work for laying the first sub element on the second sub element.

In the above configuration, the part of the first back face member may be arranged so as to protrude from the first sub element, and, after the part of the second back face member and the part of the first back face member, protruded from the first sub element, are adjacently arranged so as to overlap with each other at the time when the second sub element is mated, the seat pad and the back face member may be integrated with each other by carrying out molding through inflating resin in the molding die.

According to the above aspect, the part of the first back face member is arranged so as to protrude from the first sub element, and, after the part of the second back face member and the part of the first back face member, protruded from the first sub element, are adjacently arranged so as to overlap with each other at the time when the second sub element is mated, the seat pad and the back face member are integrated with each other by carrying out molding through inflating resin in the molding die. Therefore, it is possible to smoothly adjacently arrange the first back face member and the second back face member, and the part of the first back face member, protruded from the first sub element, can work to press the second back face member so as to overlap with the second back face member supported by the second sub element through inflating resin, so it is possible to integrally mold the seat pad with the back face member in a further appropriate state.

According to the aspect of the invention, it is possible to arrange the back face member at a required portion at the time of manufacturing the seat pad structure in which the seat pad and the back face member are integrally molded.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 5:
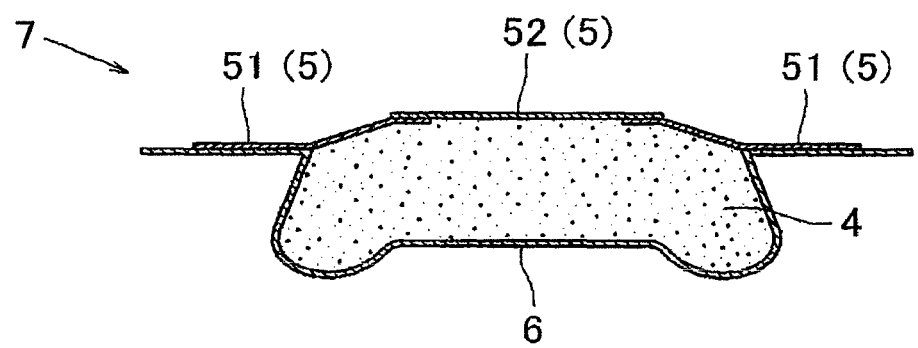
FIG. 5 is a conceptual view of a seat pad structure taken out from the foaming die.
Figure 6:
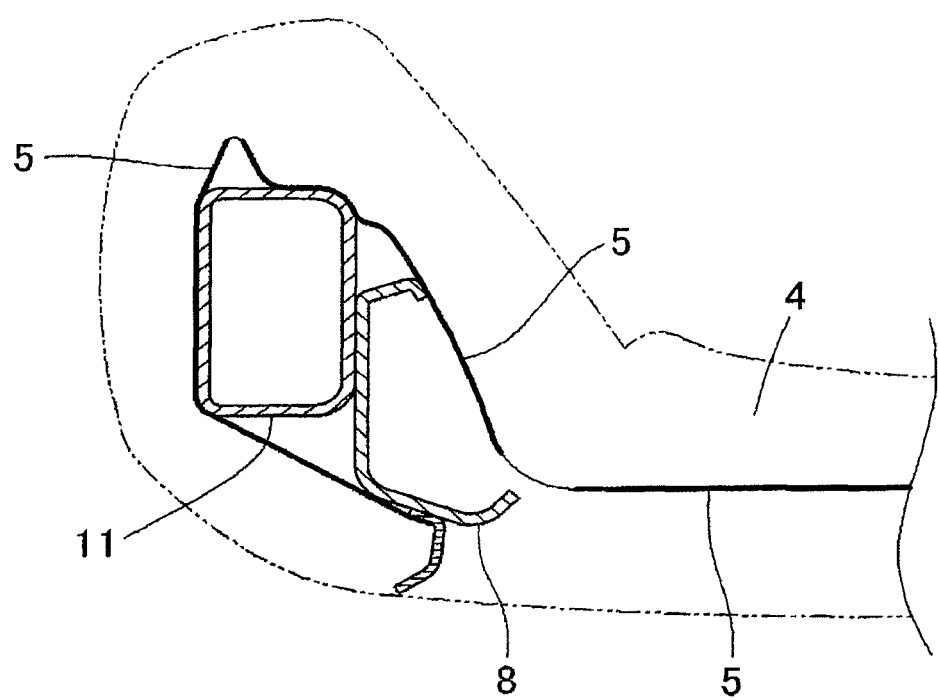
FIG. 6 is a cross-sectional view of a seat back according to the existing art.

Hereinafter, an embodiment of the invention will be described with reference to the accompanying drawings where appropriate. The drawings shown for illustrating a manufacturing method for a molded product are drawings in which characteristic portions are exaggeratedly picked up for the sake of understanding of the invention. Therefore, the shape of a seat pad 4 shown in FIG. 2 does not coincide with the shape of the seat pad 4 shown in FIG. 5. In the present embodiment, a conveyance seat 1 includes a seat pad structure 7 in which a seat cover 6, the seat pad 4 and back face members 5 are integrally molded, and is a vehicle seat. The seat cover 6 is arranged on a seating face side of the seat pad 4, and the back face members 5 paired with the seat cover 6 are located so as to sandwich the seat pad 4. In the present embodiment, the two back face members 5 are provided in correspondence with the seat pad 4. A first back face member 51 is one of the back face members 5, having an open portion at its center. A second back face member 52 is arranged so as to close the open portion provided in the first back face member 51. In the present embodiment, urethane raw liquid 91 that is used as a foam raw liquid 9 is caused to carry out chemical reaction to foam, thus molding the seat pad 4.

Next, a molding die 10 that is used to mold the seat pad 4 will be simply described. The molding die 10 is configured such that a center portion is formed in a hollow shape by laying the plurality of sub elements on top of each other, and is a foaming die that is used for foam-molding. Here, the molding die 10 includes a drag 102, a core 103 and a cope 101 as the sub elements of the molding die 10 (see FIG. 3 and FIG. 4). The drag 102, the core 103 and the cope 101 are coupled to each other by hinges (not shown). The drag 102 is a die in which the seat cover 6 is arranged along the inner face, and is a vessel-shaped die into which the urethane raw liquid 91 is poured. The core 103 serves to fix the seat cover 6 arranged in the drag 102 by sandwiching the seat cover 6 with the drag 102. The core 103 has the open portion at its center portion, and has such a structure that only a frame is provided. The urethane raw liquid 71 is allowed to be poured through the open portion. The open portion is also a portion that will be closed by the cope 101. The cope 101 is a die that is used to close the open portion provided in the core 103, and is a die that is set mainly from the shape of the back face side (side opposite to the side at which the seat cover 6 is located) of the seat pad 4.

Figure 3:
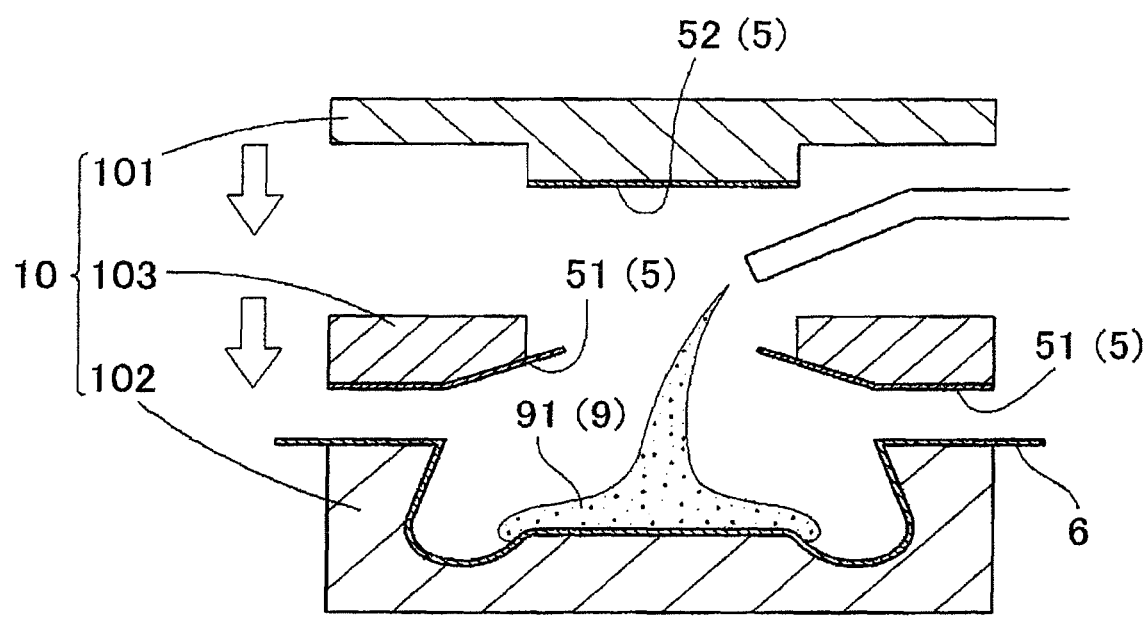
FIG. 3 is a conceptual view that shows a state where a seat cover and the back face members are set in sub elements of a foaming die.
Figure 4:
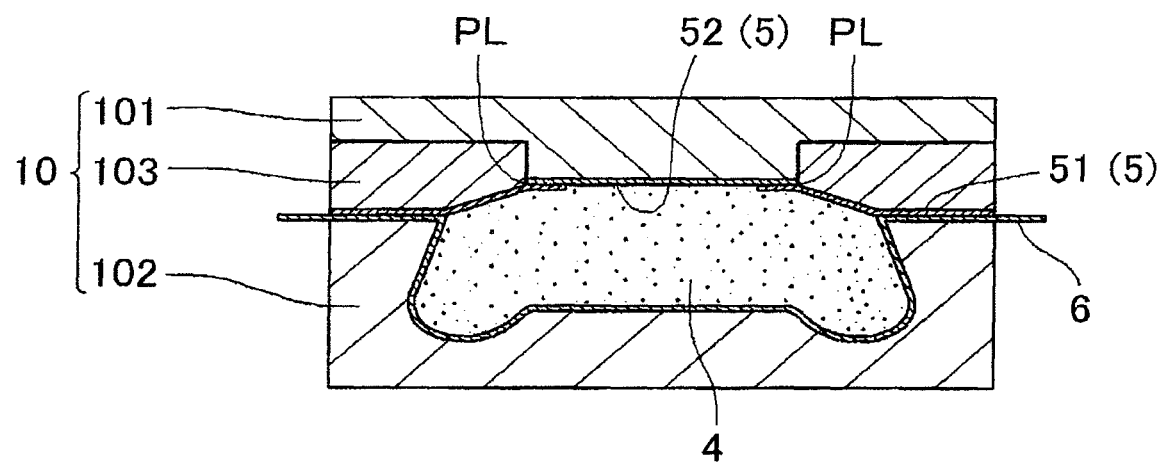
FIG. 4 is a conceptual view that shows a state where a foam resin is filled in the foaming die.

Next, a method of manufacturing the seat pad structure 7 will be described. As shown in FIG. 3, the seat cover 6 is set along the inner face of the vessel-shaped drag 102. At this time, the seat cover 6 is set such that the seating face of the seat cover 6 faces the inner face of the drag 102. Because setting of the seat cover 6 requires utmost care, the seat cover 6 is set so as to be in close contact with the drag 102 by hand. After the seat cover 6 is set to the drag 102, the core 103 is laid over the drag 102 such that the frame shape is located along the periphery of the drag 102. The first back face member 51 is temporarily tacked to the lower face of the core 103. The first back face member 51 includes a magnet (not shown), and is temporarily tacked to the core 103 by magnetic force generated by the magnet. Part of the first back face member 51 is arranged so as to protrude toward the open portion provided in the core 103. By laying the core 103 on the drag 102 so as to be located along the periphery of the drag 102, the seat cover 6 is firmly fixed to the drag 102 (see FIG. 4). Thus, it is possible to prevent misalignment of the seat cover 6 during the following work. In this state, the two-liquid mixed urethane raw liquid 91 is poured onto the seat cover 6. At the time when the urethane raw liquid 91 is poured, in order to pour the urethane raw liquid 91 in a state of being isolated from a worker, actually, the molding die 10 moves as the worker presses a pushbutton, and the urethane raw liquid 91 is poured at a moved destination. Because the seat cover 6 is fixed by the drag 102 and the core 103, it is possible to suppress misalignment of the seat cover 6 even at the time when the molding die 10 moves. After an adequate amount of the urethane raw liquid 91 is poured onto the seat cover 6, the cope 101 is closed (see FIG. 4). The second back face member 52 is temporarily tacked to the lower face of the cope 101. The second back face member 52 as well as the first back face member 51 also includes a magnet (not shown), and is temporarily tacked to the cope 101 by magnetic force generated by the magnet. The second back face member 52 temporarily tacked to the cope 101 does not protrude from a face formed on the cope 101, and is arranged along the lower face of the cope 101. By laying the cope 101 on the core 103, the second back face member 52 arranged on the cope 101 overlaps with the first back face member 51 arranged on the core 103. In this state, the first back face member 51 and the second back face member 52 do not need to be completely in close contact with each other. In the present embodiment, the parting line PL formed between the cope 101 and the core 103 is mainly covered with and hidden by the first back face member 51. The end portion of the first back face member 51 overlaps with the second back face member 52, so no gap is formed between the first back face member 51 and the second back face member 52. The length of the portion at which the first back face member 51 overlaps with the second back face member 52 is set so as to be uniformly about 1 cm.

In a state where the open portion of the core 103 is closed by the cope 101, the urethane raw liquid 91 is heated so as to foam, and is caused to carry out chemical reaction. By foaming the urethane raw liquid 91 to be inflated, urethane is filled in the molding die 10, and is solidified (see FIG. 4). After urethane is filled in the molding die 10, the urethane is cooled, and the cope 101 is removed. After that, the core 103 is removed, and, furthermore, the seat pad structure 7 that is a molded product is taken out from the molding die 10 (see FIG. 5). Through the above-described series of processes, the seat pad structure 7 in which the back face members 5, the seat cover 6 and the seat pad 4 are integrated with one another is completed. By assembling the seat pad structure 7 to the seat frame 8 as usual and mounting the other portions, the conveyance seat 1 is completed.

Figure 1:
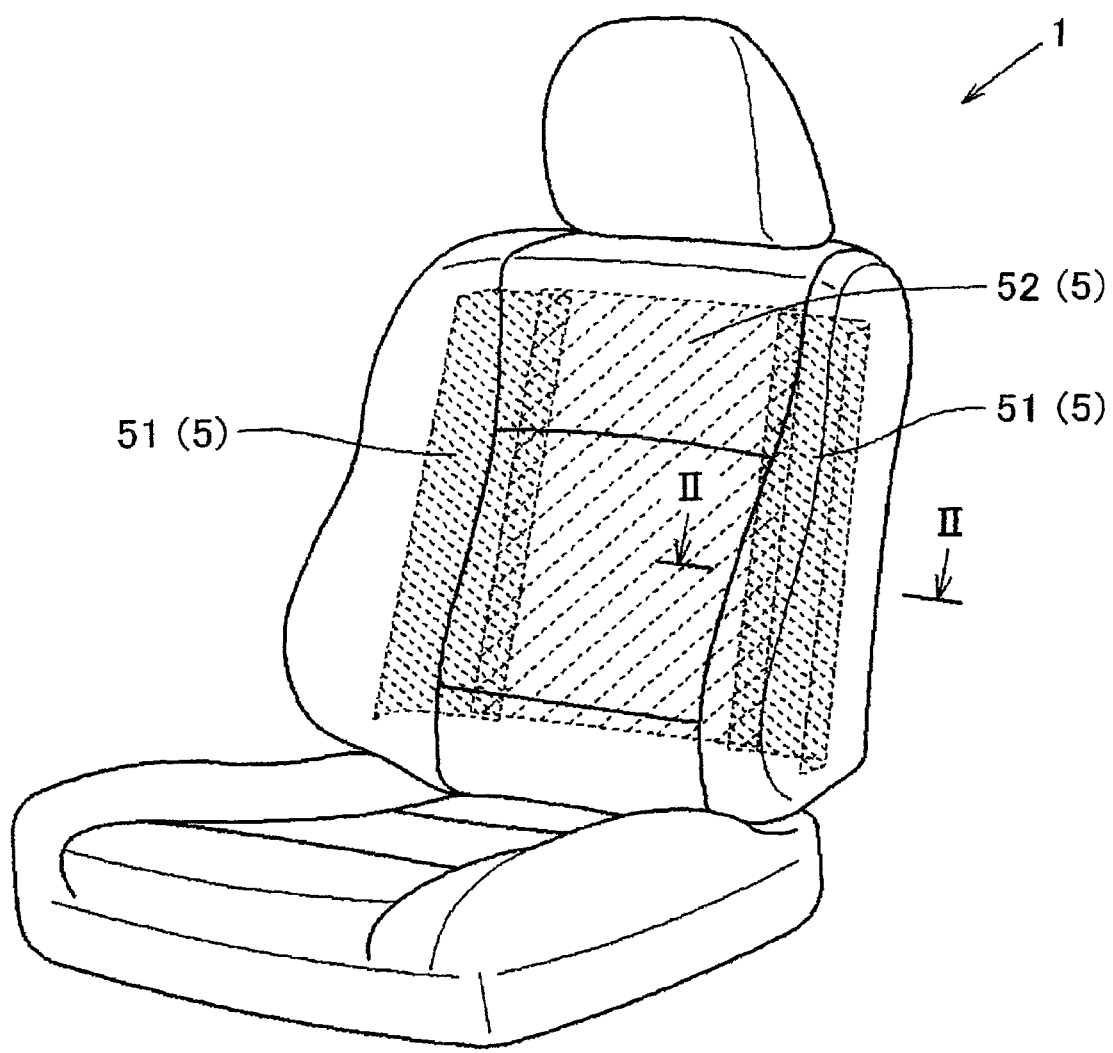
FIG. 1 is a conceptual view that schematically shows a portion at which back face members are arranged according to an embodiment.
Figure 2:
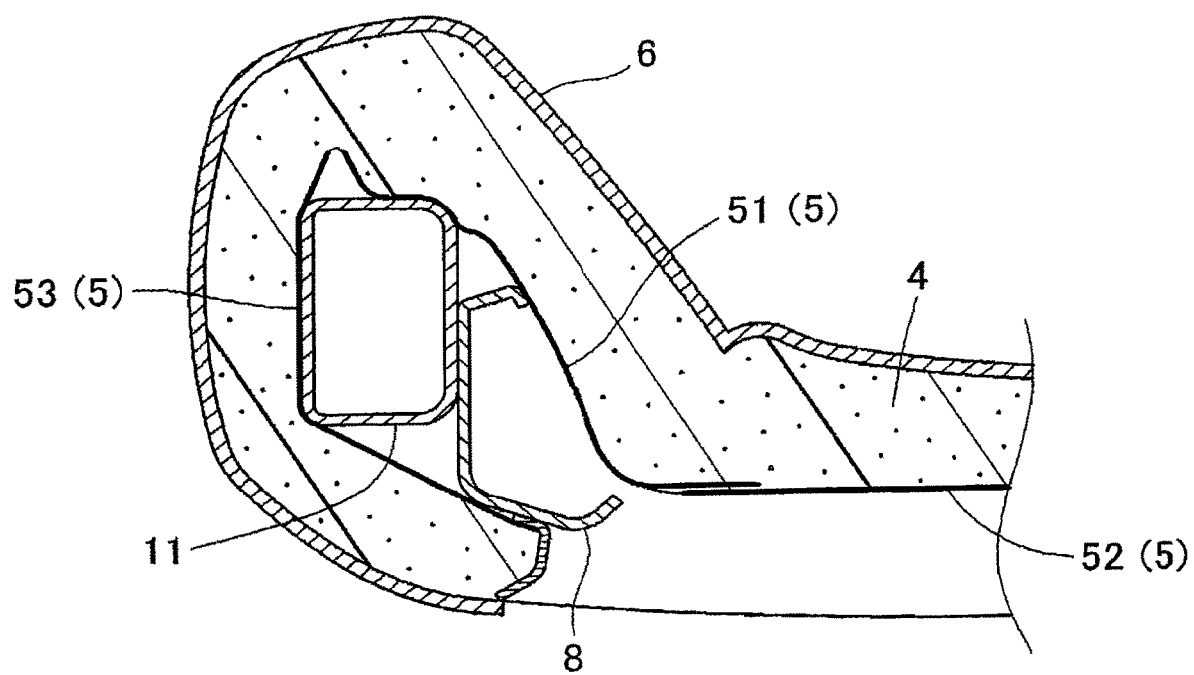
FIG. 2 is a partially enlarged cross-sectional view taken along the line II-II in FIG. 1.

In FIG. 2 in the present embodiment, a third back face member 53 and the second back face member 52 do not overlap with each other. This is because, by providing a portion having a low stiffness, at which the back face members 5 are not continuous, the seat pad 4 is allowed to break at the time when an airbag module 11 pops up from a bag element. That is, the back side of the seat pad 4 does not require stiffness at all the portions or does not contact with the seat frame 8, and the like, at all the portions. Rather, there is also a place that does not require the back face members 5. The manufacturing method according to the invention just needs to be applied to only a required portion, and is not intended to continuously arrange all the back face members 5 integrated with the seat pad 4.

With the above-described manufacturing method for the conveyance seat 1, all the parting line PL formed by laying the cope 101 and the core 103 on top of each other is covered with the back face members 5, so it is possible to suppress entry of urethane resin into the gap between the cope 101 and the core 103. In addition, the adjacent back face members 5 are arranged so as to overlap with each other, so it is possible to avoid an inconvenience that there occurs a portion at which the back face members 5 are not allowed to be arranged. Because the back face members 5 are arranged so as to cover the parting line PL, it is possible to suppress entry of urethane resin into the gap between the sub elements. The back face members 5 are bonded to each other by urethane resin, so additional work for connecting the back face members 5 is not required. Because foamed urethane inflates from the lower side toward the upper side, and the like, at the time when urethane is filled into the molding die 10, the urethane can act so as to press the first back face member 51 toward the second back face member 52. In addition, the first back face member 51 and the second back face member 52 are able to impregnate urethane resin, so urethane resin impregnated in the first back face member 51 also serves to bond the first back face member 51 to the second back face member 52. Even when urethane inflates at the time of foaming, entry of urethane into the parting line PL is suppressed by the presence of the first back face member 51 located so as to cover the parting line PL. Because one of the back face members 5 is arranged so as to cover another one of the back face members 5 protruded from the sub element, it is easy to suppress entry of the back face member 5 into the gap between the sub elements. Because the back face members 5 that are able to impregnate urethane resin, the back face members 5 are easily bonded to each other, and, furthermore, the stiffness of the portion at which the back face members 5 are arranged is easily increased.

The one embodiment is described above; however, the invention may be implemented in various other forms other than the above-described embodiment. For example, the molding die does not need to be formed of three sub elements, and may be formed of two or four or more sub elements. However, at the time of integrally molding the seat cover with the seat pad, the molding die is desirably formed of three or more sub elements. This is, for example, because the seat cover is fixed by the two sub elements and the remaining sub element is allowed to be assembled after the fixed state is visually recognized and, as a result, it is possible to suppress occurrence of a defective product. The entire parting line of the molding die does not need to be covered with the back face members. The invention just needs to be implemented only at the portion at which there occurs an inconvenience due to the fact that the back face member cannot be arranged. The seat pad does not need to be molded by foaming urethane raw liquid. Another known resin may be employed. The seat pad structure does not need to be integrally molded from the seat cover and the seat pad. It may be configured such that the invention is applied to the conveyance seat by covering the seat cover on the seat pad structure in which the seat pad and the back face members are integrally molded later. The back face members do not need to be able to impregnate foam resin, all the plurality of back face members do not need to be the back face members of the same type, and any shape is applicable. Only the two back face members do not need to overlap with each other. The three or more back face members may overlap with each other. The back face members do not need to overlap in the up and down direction, and may overlap in the right and left direction, or the like. The back face members do not need to be temporarily tacked to the sub elements with the use of the magnets. It is also applicable that anchor portions are respectively provided in the sub elements and the back face members are temporarily tacked to the anchor portions. In the present embodiment, the back face members are provided in the seat back. Instead, the back face members may be provided in a seat cushion, and there are no limitations on arrangement portion. In the embodiment, the length of the portion at which the first back face member overlaps with the second back face member is set so as to be uniformly about 1 cm. Instead, the length may be longer than that or may be shorter than that. The overlapped length may be partially increased or reduced. The conveyance is not limited to the vehicle; and may be a conveyance that flies in the air, such as an airplane and a helicopter, or a conveyance that moves on the sea, in the sea, such as a ship and a submarine, or the like.

What is claimed is:

1. A manufacturing method for a conveyance seat having a pad structure including a seat pad and a back face member, the manufacturing method comprising:
    integrally molding the seat pad with the back face member in a state where the back face member is arranged so as to cross over a parting line that is formed by laying a first sub element and a second sub element of a molding die on top of each other, the back face member crossing over the parting line from the first sub element to the second sub element, the molding die being formed of at least the first sub element and the second sub element.

2. The manufacturing method according to claim 1, further comprising:

arranging a first back face member on the first sub element;

arranging a second back face member on the second sub element;

adjacently arranging part of the first back face member and part of the second back face member such that the part of the first back face member and the part of the second back face member overlap with each other by combining the first sub element with the second sub element; and integrating the seat pad with the back face member by carrying out molding in a state where the part of the first back face member and the part of the second back face member are arranged adjacently to each other.

3. The manufacturing method according to claim 2, wherein the part of the first back face member is arranged so as to protrude from the first sub element, and after the part of the second back face member and the part of the first back face member, protruded from the first sub element, are adjacently arranged so as to overlap with each other at the time when the second sub element is mated, the seat pad and the back face member are integrated with each other by carrying out molding through inflating resin in the molding die.

* * * * *